(12) United States Patent
Robertson et al.

(10) Patent No.: US 12,151,811 B2
(45) Date of Patent: Nov. 26, 2024

(54) TILTING WING ROTORCRAFTS AND WING ROTATION SYSTEMS

(71) Applicant: Bell Textron, Inc., Fort Worth, TX (US)

(72) Inventors: Daniel Bryan Robertson, Southlake, TX (US); Kirk Landon Groninga, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 256 days.

(21) Appl. No.: 16/538,979

(22) Filed: Aug. 13, 2019

(65) Prior Publication Data

US 2021/0047022 A1  Feb. 18, 2021

(51) Int. Cl.
*B64C 3/38* (2006.01)
*B64C 27/06* (2006.01)
(Continued)

(52) U.S. Cl.
CPC .............. *B64C 3/38* (2013.01); *B64C 27/06* (2013.01); *B64C 27/22* (2013.01); *B64C 29/0025* (2013.01); *F16H 1/28* (2013.01)

(58) Field of Classification Search
CPC ... B64C 3/38; B64C 29/0033; B64C 29/0025; B64C 1/14; B64C 25/04; B64C 27/30; B64C 29/0016; B64C 29/0091; B64C 29/02; B64C 11/28; B64C 11/48; B64C 27/50; B64C 2201/102; B64C 25/10; B64C 25/12; B64C 2025/125

See application file for complete search history.

(56) References Cited

U.S. PATENT DOCUMENTS 1,761,444 A * 6/1930 Powis ..................... B64C 27/26
244/92
1,877,902 A * 9/1932 Kuethe .................. B64C 27/12
244/6

(Continued)

FOREIGN PATENT DOCUMENTS

CN  207809768 U  *  9/2018  ............... B64C 3/38
CN  108609157 A  *  10/2018
(Continued)

OTHER PUBLICATIONS

Machine Translation of JP 07132892, Rotary-Wing Aircraft, Oct. 17, 2023, STIC.*

*Primary Examiner* — Joshua J Michener
*Assistant Examiner* — Cindi M Curry
(74) *Attorney, Agent, or Firm* — Akona IP PC

(57) ABSTRACT

According to one implementation of the present disclosure, a rotorcraft includes a fuselage, an airframe, a main rotor, first and second wings, and a wing rotation system. The wing rotation system may be coupled to the first and the second wings and includes a first drive shaft, a second drive shaft, and a uniform actuator. The first drive shaft may be coupled to the first wing for rotation around a central wing axis, the second drive shaft may be coupled to the second wing for rotation around the central wing axis, and the uniform actuator may be coupled between the first drive shaft and the airframe. Also, the wing rotation system can be configured to actuate rotation of the first and the second wings from a first direction to a second direction.

20 Claims, 13 Drawing Sheets

(51) Int. Cl.
  *B64C 27/22* (2006.01)
  *B64C 29/00* (2006.01)
  *F16H 1/28* (2006.01)

(56) References Cited

U.S. PATENT DOCUMENTS

| | | | | | |
|---|---|---|---|---|---|
| 2,959,373 | A * | 11/1960 | Zuck | | B64C 27/30 |
| | | | | | 244/7 C |
| 3,554,467 | A * | 1/1971 | Yowell | | B64C 27/10 |
| | | | | | 416/102 |
| 3,706,432 | A * | 12/1972 | Accashian | | B64C 27/82 |
| | | | | | 244/221 |
| 3,995,793 | A * | 12/1976 | Wing | | B64C 27/22 |
| | | | | | 244/17.23 |
| 4,928,907 | A * | 5/1990 | Zuck | | B64C 27/26 |
| | | | | | 244/48 |
| 5,758,844 | A * | 6/1998 | Cummings | | B64C 29/0033 |
| | | | | | 244/12.4 |
| 7,441,724 | B2 * | 10/2008 | Parks | | B64C 3/385 |
| | | | | | 244/3.28 |
| 7,472,863 | B2 * | 1/2009 | Pak | | A63H 27/14 |
| | | | | | 244/12.5 |
| 8,556,207 | B2 * | 10/2013 | Cilli | | B64C 27/10 |
| | | | | | 244/17.23 |
| 9,616,995 | B2 * | 4/2017 | Watkins | | B64C 27/24 |
| 9,623,966 | B1 * | 4/2017 | van der Westhuizen | | |
| | | | | | B64C 27/18 |
| 2011/0036954 | A1 * | 2/2011 | Piasecki | | B64C 27/12 |
| | | | | | 244/7 A |
| 2019/0039728 | A1 * | 2/2019 | Hutson | | B64C 29/00 |
| 2019/0248492 | A1 * | 8/2019 | Roldan De Perera | | B64C 3/56 |
| 2021/0070431 | A1 * | 3/2021 | NakaMats | | B64U 30/10 |

FOREIGN PATENT DOCUMENTS

| | | | | |
|---|---|---|---|---|
| JP | H07132893 A | * | 5/1995 | |
| KR | 20180076348 A | * | 7/2018 | B64C 29/02 |

* cited by examiner

TILTING WING ROTORCRAFTS AND WING ROTATION SYSTEMS

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Lift compounding by the addition of wings on a rotorcraft (e.g., helicopter) can reduce the amount of thrust required from the main rotor of the rotorcraft. Correspondingly, offloading power from the main rotor can also provide reduced rotor chord solidity for aircrafts designed for high speed forward-flight. However, adding wings to the rotorcraft can increase rotor download; thus, increasing the amount of thrust and power required for hover and low speed forward-flight.

SUMMARY

According to one implementation of the present disclosure, a rotorcraft includes a fuselage, an airframe, a main rotor, first and second wings, and a wing rotation system. The wing rotation system may be coupled to the first and the second wings and includes a first drive shaft, a second drive shaft, and a uniform actuator. The first drive shaft may be coupled to the first wing for rotation around a central wing axis, the second drive shaft may be coupled to the second wing for rotation around the central wing axis, and the uniform actuator may be coupled between the first drive shaft and the airframe. Also, the wing rotation system can be configured to actuate rotation of the first and the second wings from a first direction to a second direction.

According to one implementation of the present disclosure, a wing rotation system of a rotorcraft includes a first drive shaft, a second drive shaft, and a uniform actuator. The first drive shaft may be coupled to a first wing for rotation around a central wing axis, the second drive shaft may be coupled to the second wing for rotation around the central wing axis, and the uniform actuator may be coupled between the first drive shaft and an airframe. Also, the wing rotation system may be configured to actuate rotation of the first and the second wings from a first direction to a second direction.

According to another implementation of the present disclosure, a rotorcraft includes a fuselage, an airframe, a main rotor, and first and second wings. Also, the first and the second wings may be configured to tilt in different directions.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Example embodiments of the present disclosure combine forward-flight and anti-torque support systems for rotorcraft wings in one system without the need of thrusters or any other propulsion device. Suitably, such embodiments provide for lift offload without incurring a substantial download penalty.

Advantageously, in one inventive aspect, left and right wings of a rotorcraft may rotate downward into a vertical positioning to minimize rotor download (in hover mode), as well as rotate upward into a horizontal positioning to offload rotor power and provide additional lift (in forward-flight mode). In another aspect, tilting the left and right wings to various different positions can further supplement the anti-torque system and reduce tail rotor power by having opposing angles-of-attack relative to the main rotor downwash. Moreover, inventive aspects of the present disclosure allow for the capacity of a wing rotation system that can actuate one or more wings to provide a full 360° range of rotation.

Figure 1:
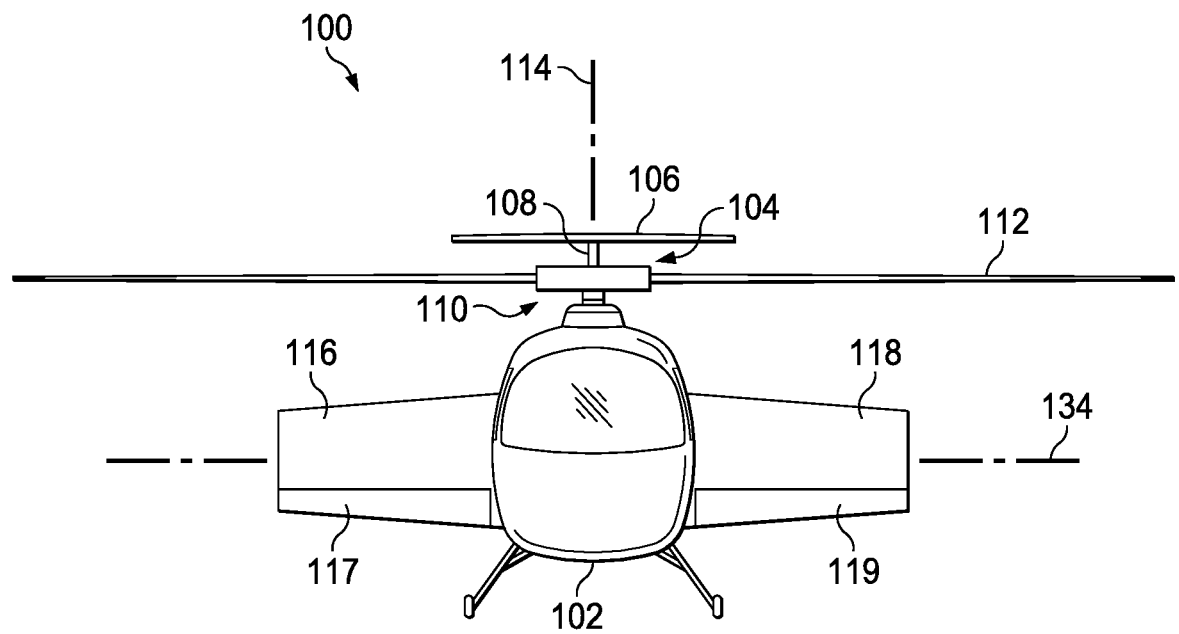
FIG. 1 illustrates a front view of a rotorcraft in accordance with implementations of various techniques described herein.
Figure 2:
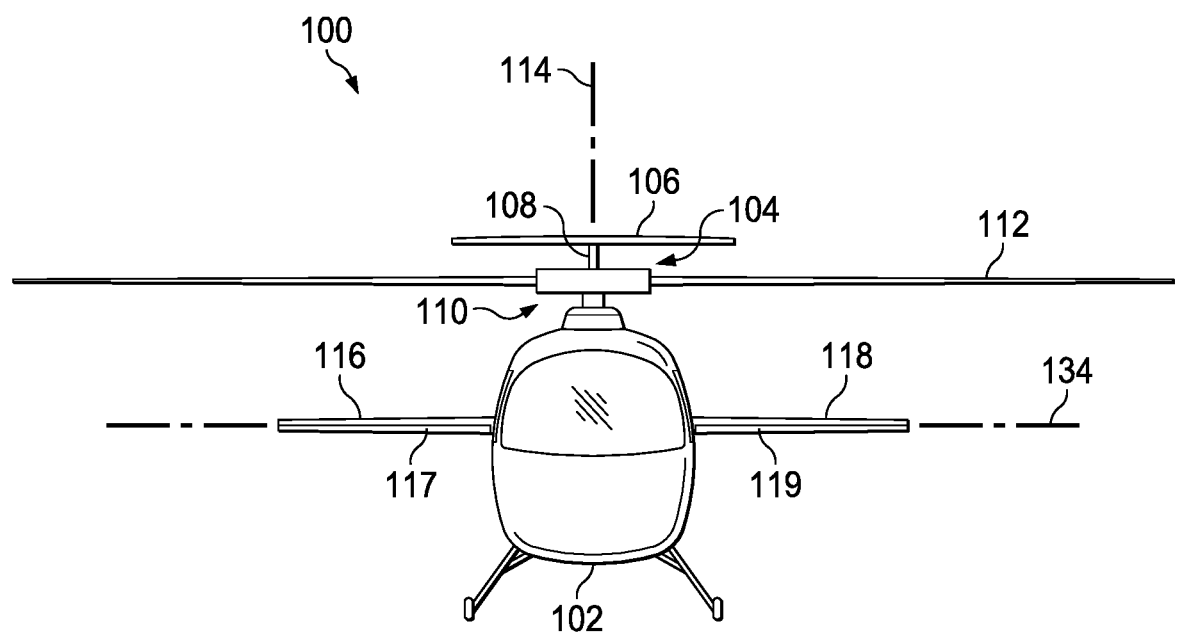
FIG. 2 illustrates a front view of a rotorcraft in accordance with implementations of various techniques described herein.

Referring to FIGS. 1 and 2, perspective views of an aircraft 100 that is convertible between hover mode (i.e., hover position, anti-torque position, stabilizing position) (allowing for vertical takeoff and landing, hovering, and low speed directional movement) (FIG. 1) and forward-flight mode (i.e., forward-flight position, cruise mode) (allowing for high-speed forward-flight as well as horizontal takeoff and landing) (FIG. 1) are shown. As illustrated, in certain implementations, the aircraft 100 (i.e., rotorcraft) may include a fuselage 102 (coupled to an airframe housed therein), a tail section 104 (including horizontal and vertical stabilizers 106, 108), a main rotor 110 (including a plurality of main rotor blades 112 configured to rotate about a vertical mast axis 114), and first and second wings 116, 118 (extending from opposing sides of the fuselage 102). Advantageously, as shown in FIG. 1, for hover mode, the first and second wings 116, 118 may be configured to rotate to a vertical positioning (i.e., a first positioning) to decrease rotor download on the aircraft 100. In contrast, as shown in FIG. 2, for forward-fight mode, the first and second wings 116, 118 may be configured to rotate to a horizontal positioning (i.e., a second positioning) to provide additional lift (to maintain altitude) for the aircraft 100. In such instances, the rotation of the first and second wings are approximately a quarter-revolution (i.e., 90') around a rotating central wing axis 134 (i.e., rotating-axis, tilt-axis).

Also shown in FIGS. 1-2 (as well as FIGS. 3-6), the first and second wings 116, 118 may include respective first and second flaps, 117, 119. Such first and second flaps may be attached to leading or trailing edges of the first and second wings 116, 118. Moreover, for actuation of the first and second flaps 117, 119, the first and second wings 116, 118 may include separate first and second flap actuators (not shown) on inner sides of the first and second wings 116, 118. In an example operation, in response to a control signal, the first and second flap actuators can be configured to tilt the first and second flaps 117, 119 in similar or different directions relative to each other and relative to the first and second wings 116, 118.

Moreover, while the example aircraft 100 has been shown to include a Fenestron-type system, in alternative implementations, the example aircraft 100 may be compatible with other conventional anti-torque/yaw control mechanisms such as a tail rotor or NOTAR system.

Figure 3:
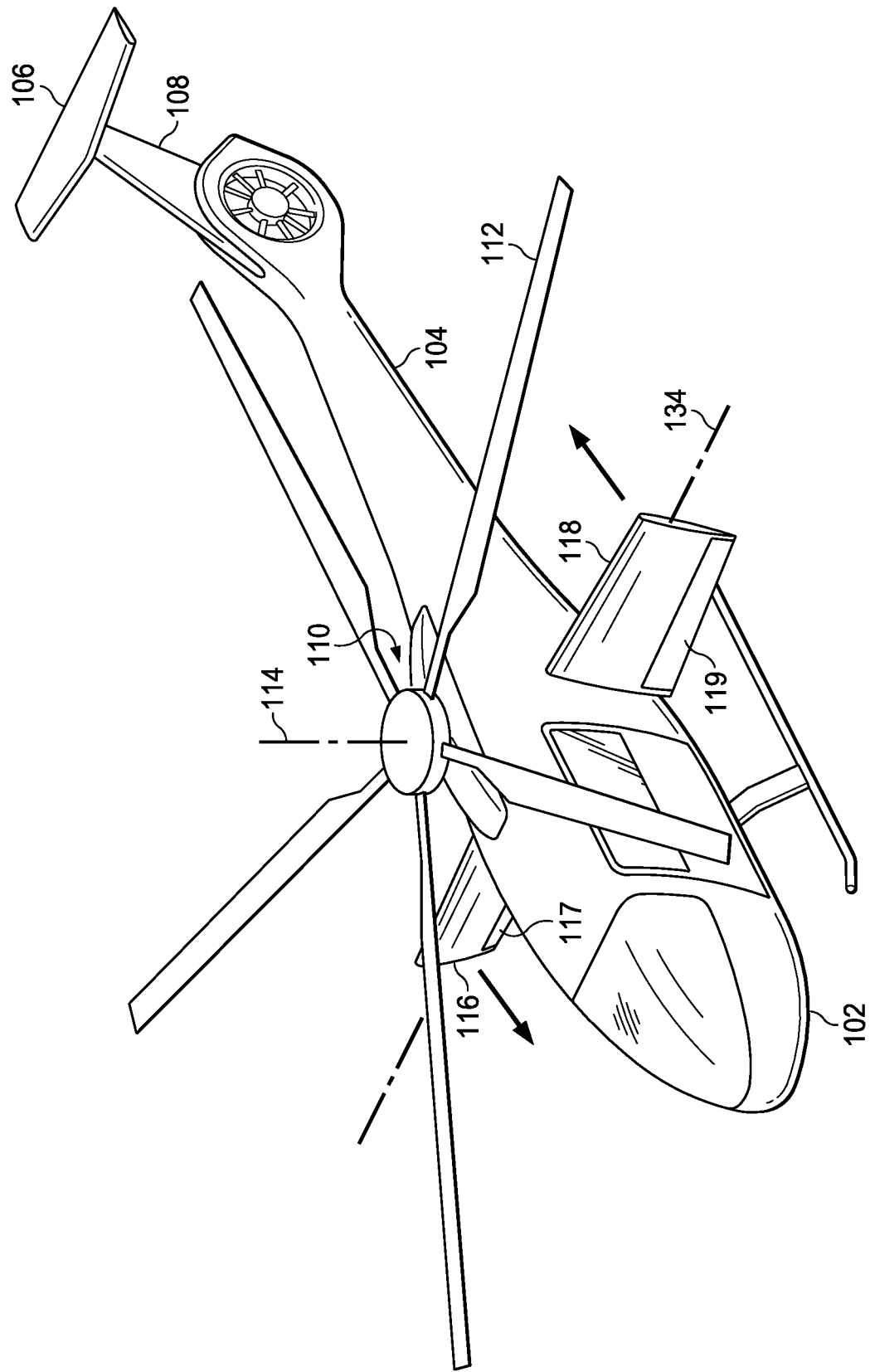
FIG. 3 illustrates a perspective view of a rotorcraft in accordance with implementations of various techniques described herein.

Referring to FIG. 3, a perspective view of the example aircraft 100 is shown. In one implementation, the first and second wings 116, 118 may be configured to differentially tilt (i.e., to face different directions in a three-dimensional space). For instance, starting from an initial positioning (e.g., vertical or horizontal), the first wing 116 may be configured to rotate (e.g., tilt) to a first position (e.g., facing or orienting to a first direction in a three-dimensional plane) around the rotating central wing axis 134 (i.e., rotating axis, tilt axis). Also, concurrently, the second wing 118 may be configured to rotate (e.g., tilt) to a second position (e.g., facing or orienting to a second direction in the three-dimensional plane that is different from the first direction in the three-dimensional plane) around the rotating central wing axis 134. Advantageously, such a differential tilting implementation can allow for additional anti-torque capabilities (e.g. to counter the torque effects of the main rotor 110). In various implementations, wing rotation systems (e.g., wing rotation systems 200, 300, 400 as described with reference to FIGS. 7A-C to 9A-C in below paragraphs) may actuate the first and second wings 116, 118 for differential tilting.

Figure 4:
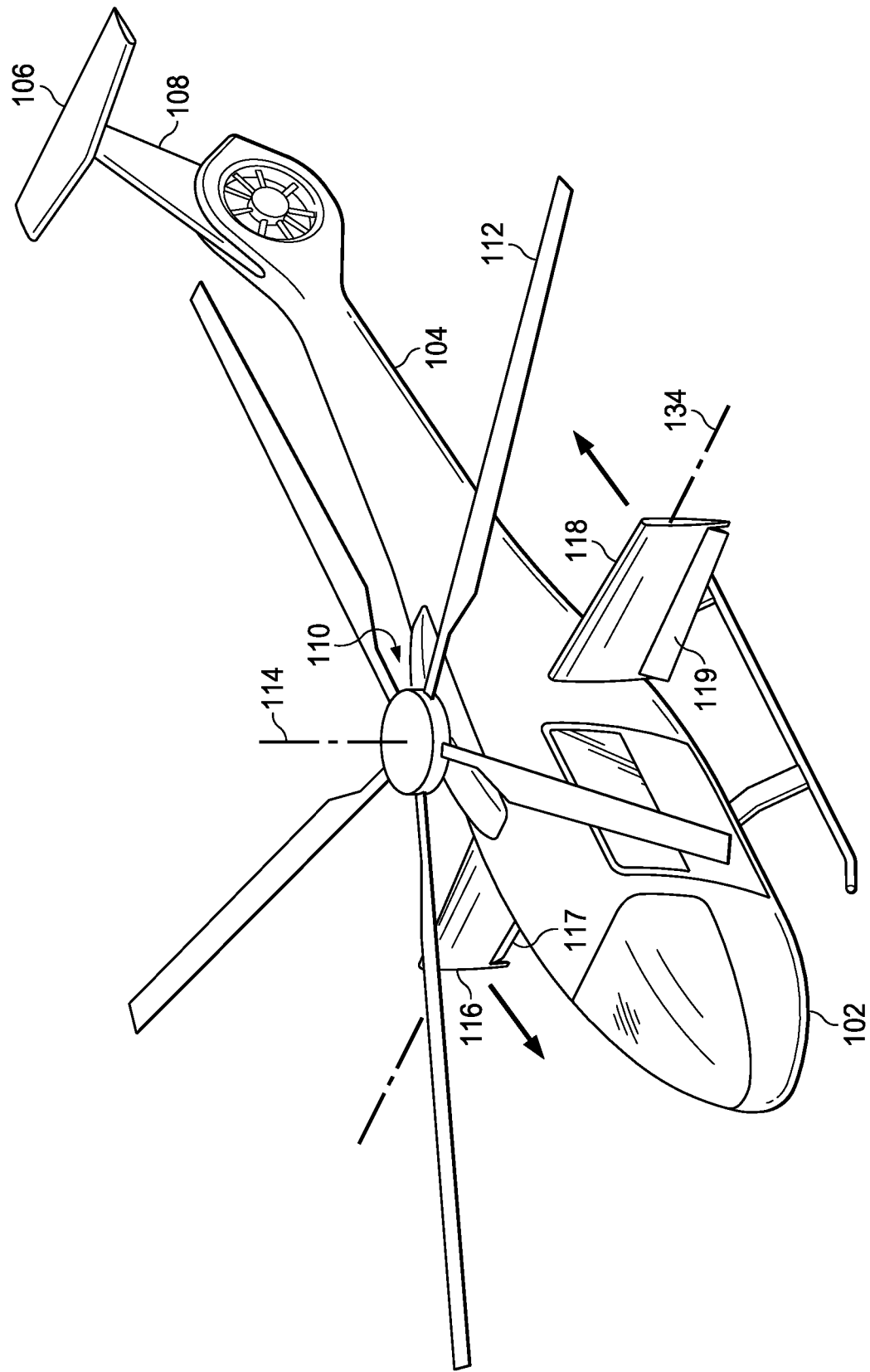
FIG. 4 illustrates a perspective view of a rotorcraft in accordance with implementations of various techniques described herein.

Referring to FIG. 4, a perspective view of the example aircraft 100 is shown. In a particular implementation, while the first and second wings 116, 118 are configured to be in a vertical positioning (e.g., in hover mode), the respective first and second flaps 117, 119 of the first and second wings 116, 118 may be configured to differentially tilt. For instance, starting from an initial positioning, the respective flap 117 of the first wing 116 may be configured to rotate (e.g., tilt) to a first position (i.e., a first direction) in a three-dimensional plane. Also, concurrently, the respective flap 119 of the second wing 118 may be configured to rotate (e.g., tilt) to a second position (i.e., a second direction) in the three-dimensional plane (that is different from the first direction in the three-dimensional plane). Advantageously, such differential tilting implementations of the first and second flaps 117, 119 allow for additional anti-torque capabilities. In various implementations, flap actuators in conjunction with wing rotation systems (e.g., wing rotation systems 200, 300, 400 as described with reference to FIGS. 7A-C to 9A-C in below paragraphs) may actuate the first and second wings 116, 118 and the first and second flaps 117, 119 for differential tilting.

Figure 5:
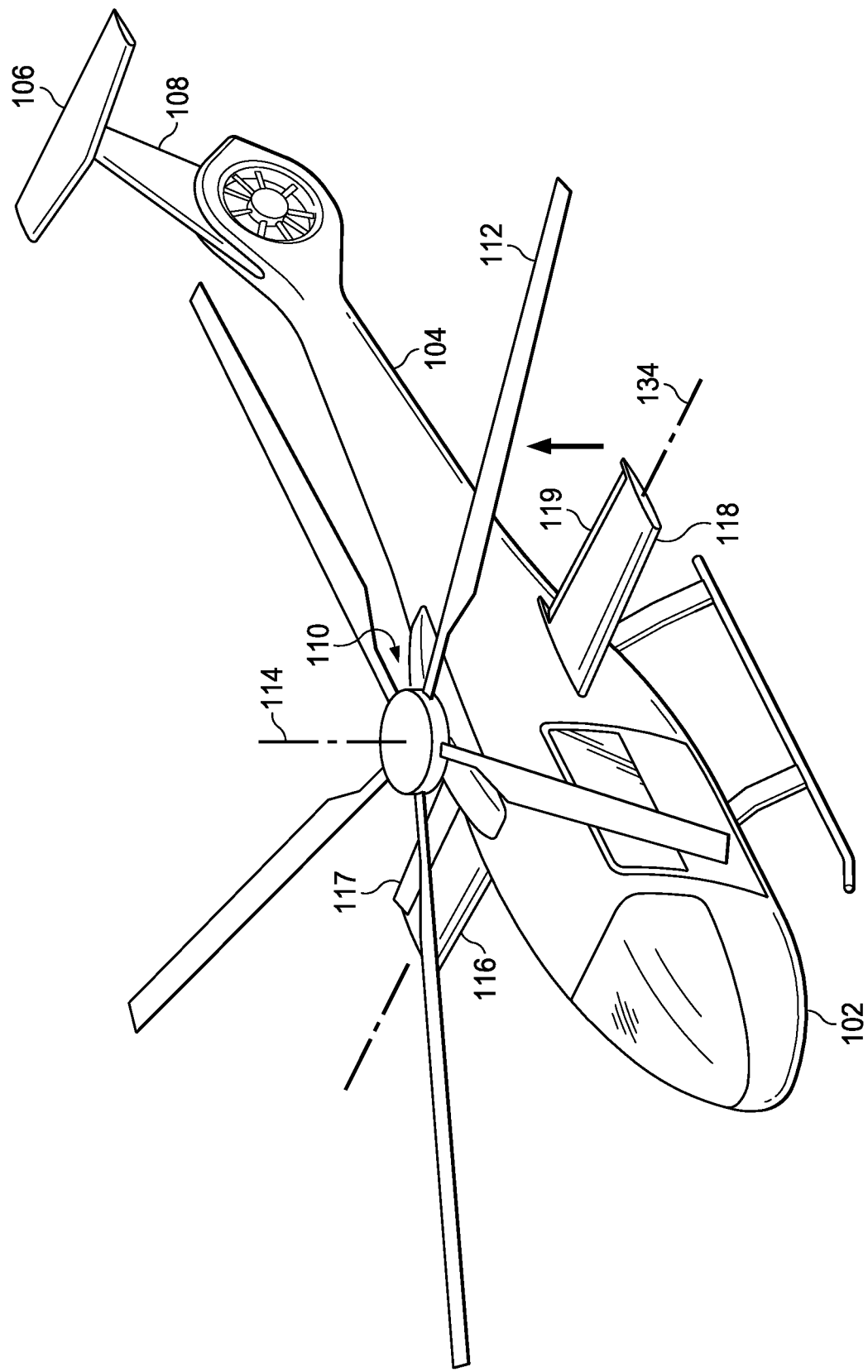
FIG. 5 illustrates a perspective view of a rotorcraft in accordance with implementations of various techniques described herein.

Referring to FIG. 5, a perspective view of the example aircraft 100 is shown. In a particular implementation, while the first and second wings 116, 118 are configured to be in a horizontal positioning (in forward-flight mode), the respective first and second flaps 117, 119 of the first and second wings 116, 118 may be configured to differentially tilt to different positions. For instance, starting from an initial positioning, the respective flap 117 of the first wing 116 may be configured to rotate (e.g., tilt) to a first position (i.e., a first direction) in a three-dimensional plane. Also, concurrently, the respective flap 119 of the second wing 118 may be configured to rotate (e.g., tilt) to a second position (i.e., a second direction) in the three-dimensional plane (that is different from the first direction in the three-dimensional plane). Advantageously, such differential tilting implementations of the first and second flaps 117, 119 can provide additional lift on one side (e.g., the left side) of the aircraft 100 to compensate for the main rotor 110 creating more lift on a second side (e.g., the right side) due to retreating blade stall.

Figure 6:
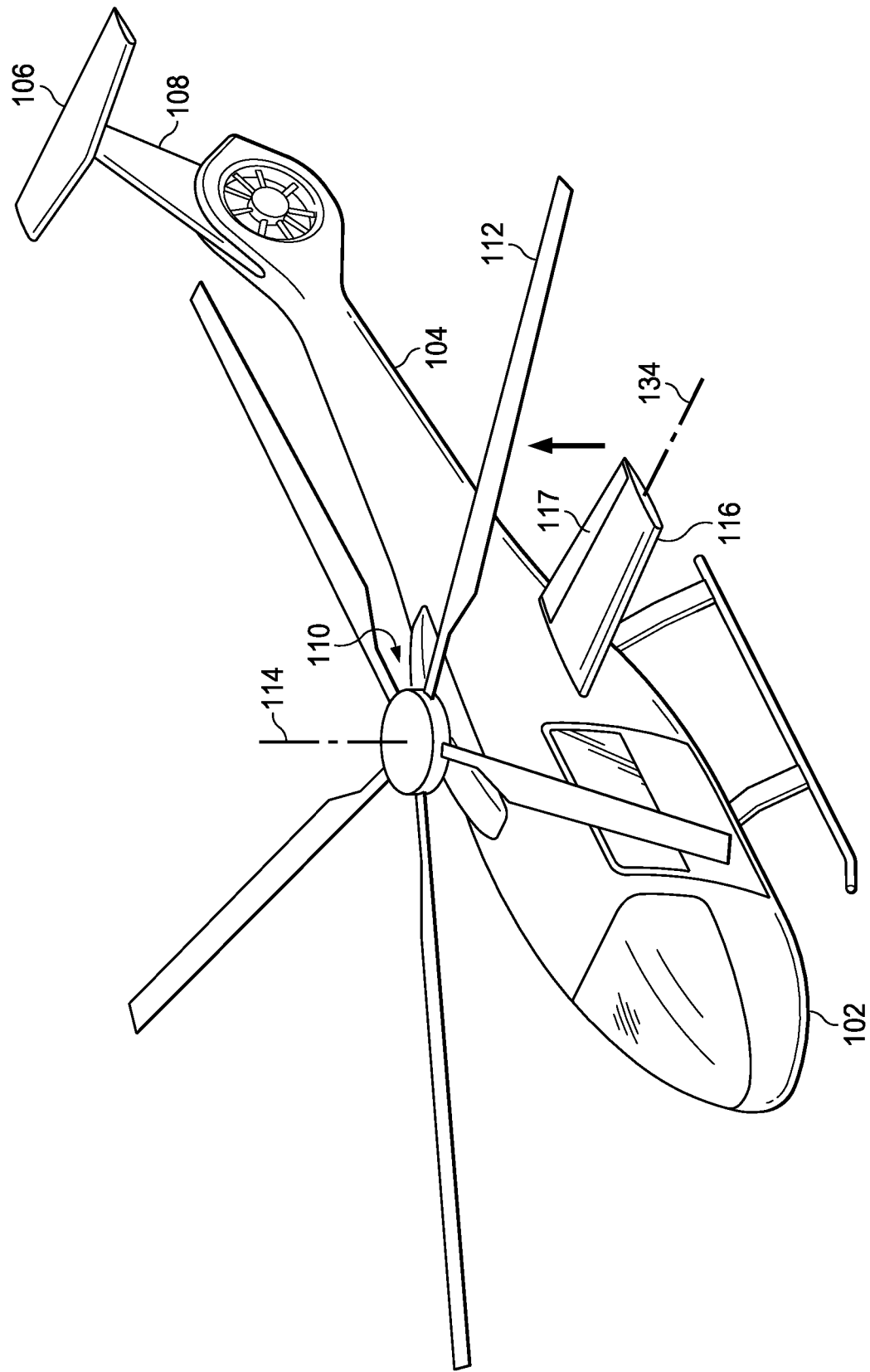
FIG. 6 illustrates a perspective view of a rotorcraft in accordance with implementations of various techniques described herein.

Referring to FIG. 6, a perspective view of the example aircraft 100 is shown. In the implementation, the example aircraft 100 includes just one wing 116 (and its respective flap 117) on one side (e.g., the left side). For instance, starting from a horizontal positioning, the respective flap 117 of the first wing 116 may be configured to rotate (e.g., tilt) to a first position (e.g., facing a first direction in the three-dimensional plane). Advantageously, such differential tilting implementations of just the respective flap 117 can provide additional lift on one side (e.g., the left side) of the aircraft 100 to compensate for the main rotor 110 creating more lift on a second side (e.g., the right side) due to retreating blade stall.

Figure 7A:
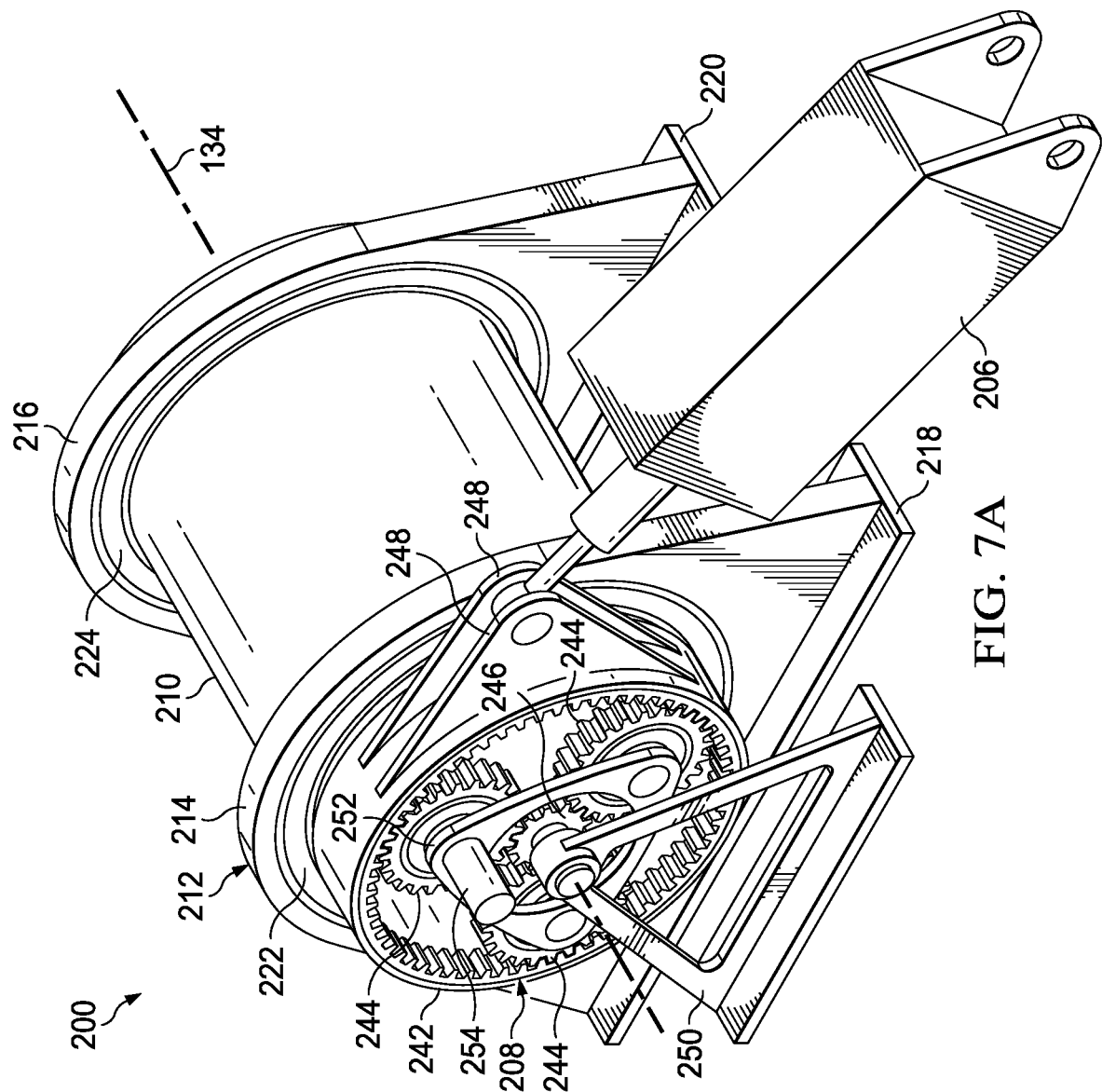
FIG. 7A is a perspective view of a first portion of a wing rotation system, in accordance with implementations of various techniques described herein.
Figure 7B:
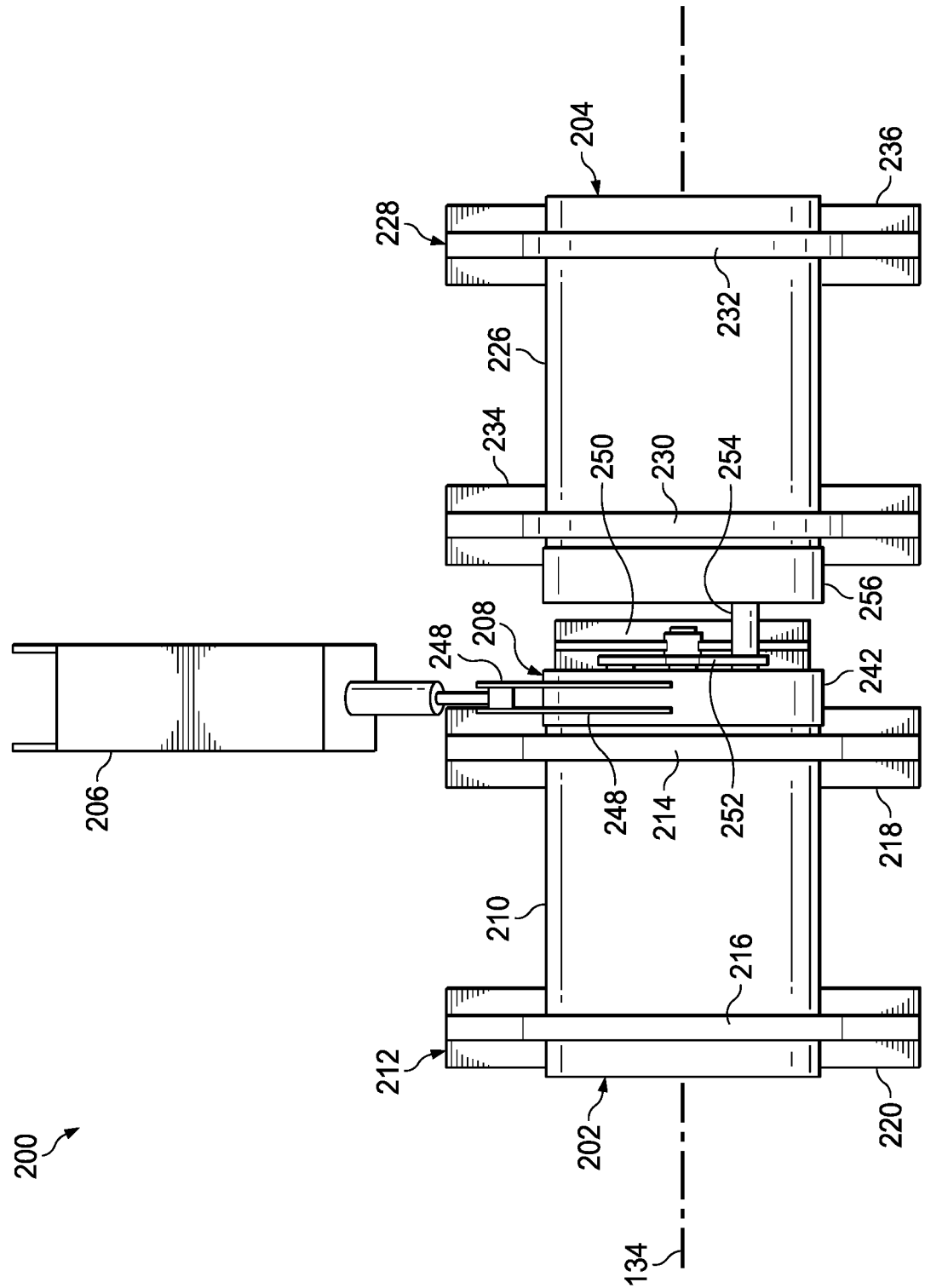
FIG. 7B is a top view of the wing rotation system of FIGS. 7A and 7C.
Figure 7C:
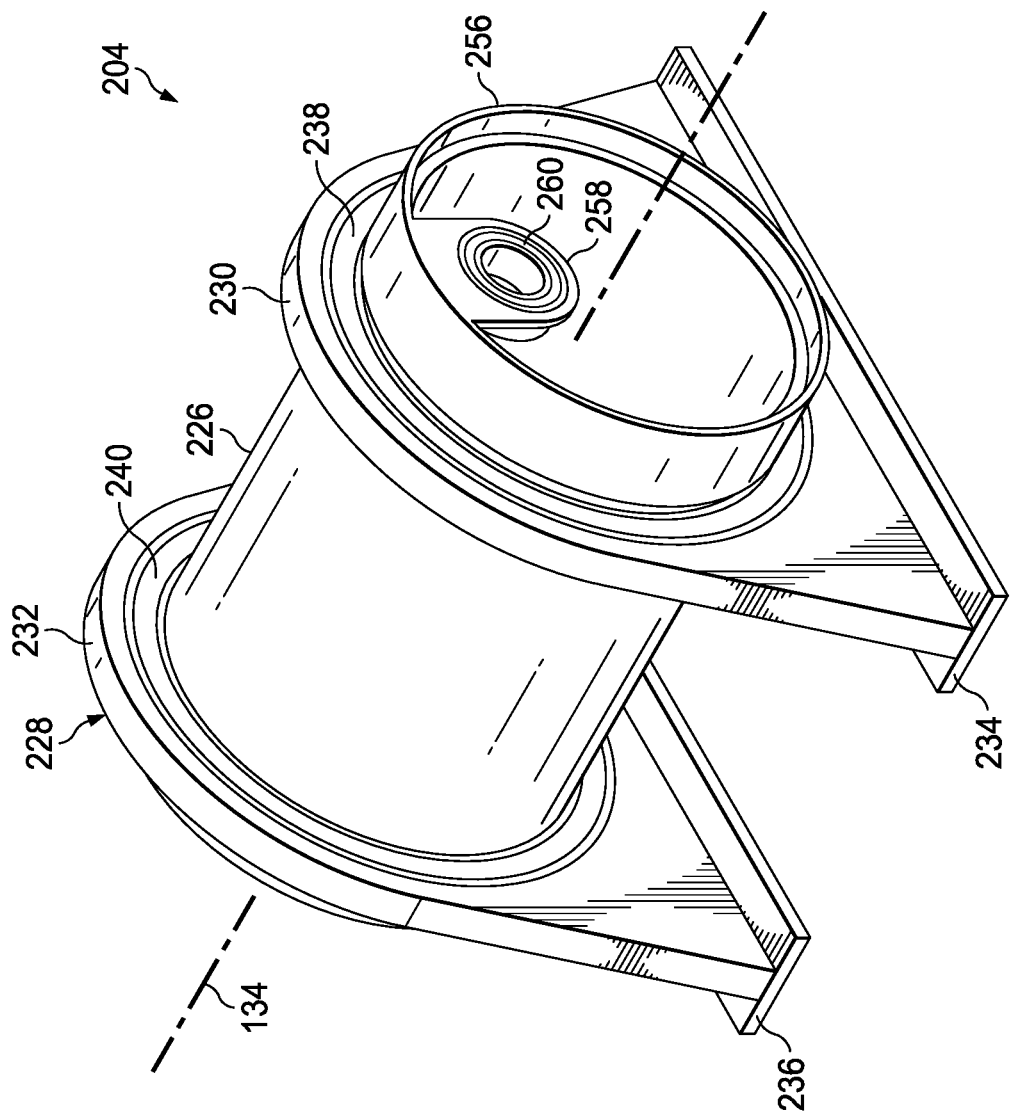
FIG. 7C is a perspective view of a second portion of the wing rotation system of FIG. 7A.

Referring to FIGS. 7A-C, an example wing rotation system 200 (i.e., differential wing rotation system) applicable for use with reference to the example aircraft 100 is shown. The wing rotation system 200 (i.e., lift offload system) may include a first wing rotation assembly 202, a second wing rotation assembly 204, a uniform actuator 206 (e.g., a pylon conversion actuator for uniform rotation), and a planetary gear system 208 (to provide speed and torque conversions allowing the uniform actuator 206 to actuate rotation of the first and second wings 116, 118).

As illustrated in FIGS. 7A and 7B, the first wing rotation assembly 202 includes a first drive shaft 210 coupled to the first wing 116 for rotation about (around) the rotating axis 134. The first drive shaft 210 may include a flange for axial bolting to an attachment support (not shown). Alternatively, or additionally, the first drive shaft 210 may fit inside the attachment support, or the attachment support may fit inside the first drive shaft 210, to provide for radial bolting (coupling and control). Also, the first drive shaft 210 may be rotatably coupled to a first pillow block assembly 212 that may include a first pedestal 214 and a second pedestal 216 axially spaced from the first pedestal 214. In certain examples, the first pedestal 214 and the second pedestal 216 may be coupled to the airframe via plates 218 and 220, respectively. Also, the first drive shaft 210 may be rotatably coupled to the first pedestal 214 and the second pedestal 216 via roller bearings 222 and 224, respectively. Furthermore, while the first pillow block assembly 212 is shown with two pedestals, it should be understood that it may include one or more pedestals in other implementations.

As illustrated in FIGS. 7B and 7C, the second wing rotation assembly 204 includes a second drive shaft 226 coupled to the second wing 118 for rotation around the rotating axis 134. The second drive shaft 226 may include a flange for axial bolting to an attachment support (not shown). Alternatively, or additionally, the second drive shaft 226 may fit inside the attachment support, or the attachment support may fit inside the first drive shaft 226, to provide for radial bolting (coupling and control). Also, the second drive shaft 226 may be rotatably coupled to a second pillow block assembly 228 that may include a first pedestal 230 and a second pedestal 232 axially spaced from the first pedestal 230. In certain examples, the first pedestal 230 and the second pedestal 232 may be coupled to the airframe via plates 234 and 236, respectively. Also, the second drive shaft 210 may be rotatably coupled to the first pedestal 230 and the second pedestal 232 via roller bearings 238 and 240, respectively. Furthermore, while the second pillow block assembly 228 is shown with two pedestals, it should be understood that it may include one or more pedestals in other implementations.

As shown in FIG. 7A, the planetary gear system 208 may include a ring gear 242, a plurality of planetary gears 244, and a sun gear 246. The ring gear 242 may be coupled to the first drive shaft 210 for rotation about the rotating axis 134. Also, the ring gear 242 may include a pair of tabs 248 configured to rotatably couple the ring gear 242 to the uniform actuator 206. Accordingly, the uniform actuator 206 may be coupled to the first drive shaft 210 through the ring gear 242 (and between the first drive shaft 210 and the airframe (not shown)). Nevertheless, in other implementations, the uniform actuator 206 may be directly coupled to the first drive shaft 210. Furthermore, the sun gear 246 may be located at the center of the planetary gear system 208 and may be fixed in position by a bracket 250. The planetary gears 244 may be coupled together via a planetary gear carrier 252 that can include a post 254 extending therefrom.

As shown in FIG. 7C, planetary gear system 208 further includes a band 256 coupled to the second drive shaft 226. The band 256 may include a projection 258 containing a roller bearing 260 configured to receive the post 254 therein. Moreover, while the planetary gear system 208 is shown with a non-rotatable sun gear 246, it should be understood that in other implementations, the ring gear 242 may be fixed and the planetary gear carrier 252 may be coupled to the first drive shaft 210 and uniform actuator 206 while the sun gear is coupled for rotation with the second drive shaft 226.

In an example operation, the actuation of the uniform actuator 206 may cause the ring gear 242, the first drive shaft 210, and the first wing 116 to rotate together around the rotating axis 134. Suitably, as the sun gear 246 is fixed, the rotation of the ring gear 242 would cause the planetary gears 244, along with the planetary gear carrier 252, band 256, the second drive shaft 226, and the second wing 118 to also rotate around the rotating axis 134, but at a slower rate of rotation. That is, the actuation of the uniform actuator 206 would cause both the first wing 116 and the second wing 118 to rotate around the rotating axis 134, but the first wing 116 would rotate (tilt) further than the second wing 118. Hence, in this manner, the first and second wings 116, 118 of the example rotorcraft 100 may be configured for differential tilting.

While the wing rotation system 200 is depicted with the uniform actuator 206 as a linear actuator, it should be understood that in some cases, the uniform actuator 206 may comprise a rotary actuator. Moreover, in other cases, the uniform actuator 206 may be pneumatic, hydraulic, electric, or electromagnetic. Additionally, the system 200 may be configured such that failure of the uniform actuator 206 would result in the first wing 116 and the second wing 118 automatically defaulting to either the hover position or the forward flight position, depending on the mission of the example aircraft 100 and/or the preference for a vertical landing versus a horizontal landing.

Figure 8A:
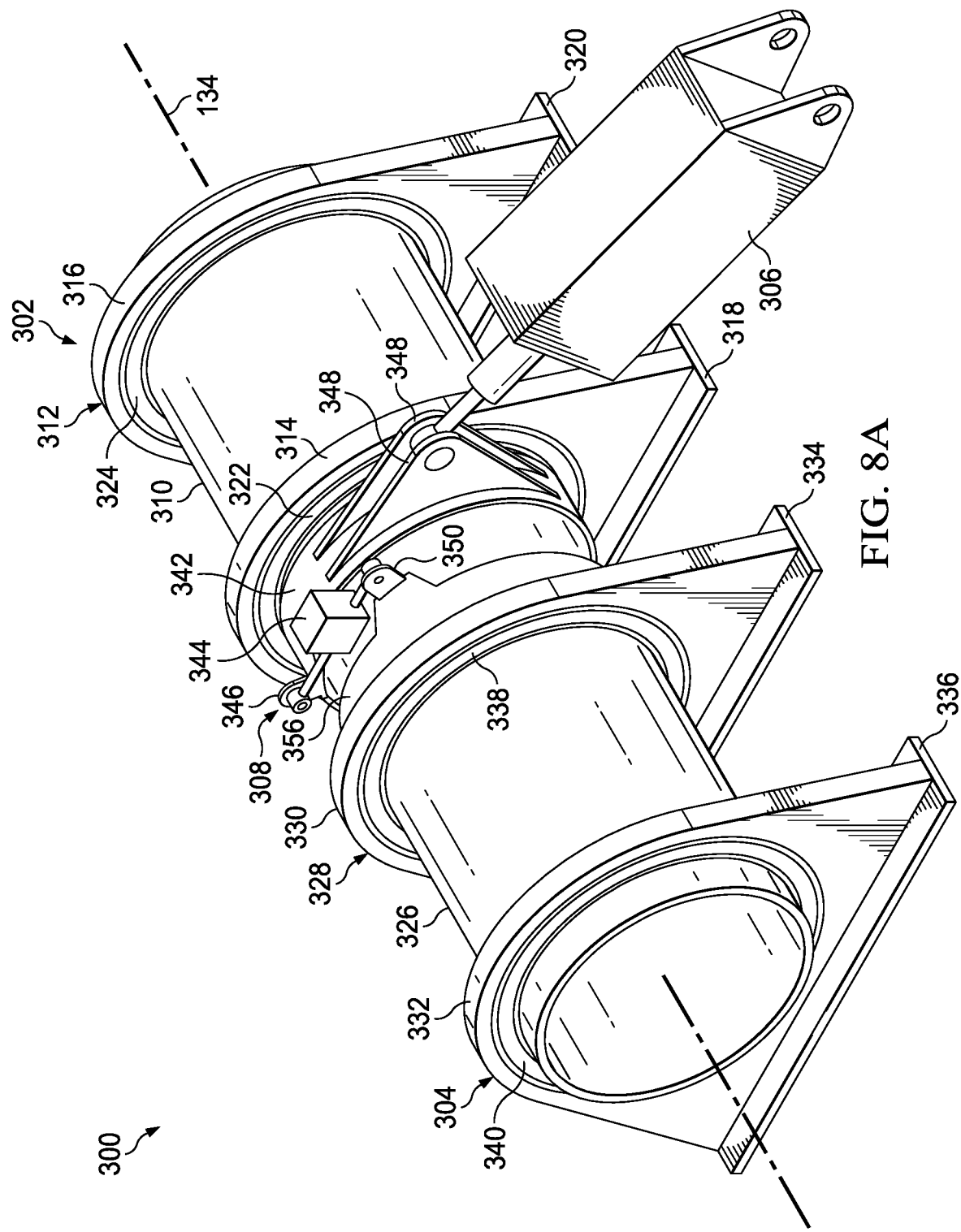
FIG. 8A is a perspective view of another wing rotation system, in accordance with implementations of various techniques described herein.
Figure 8B:
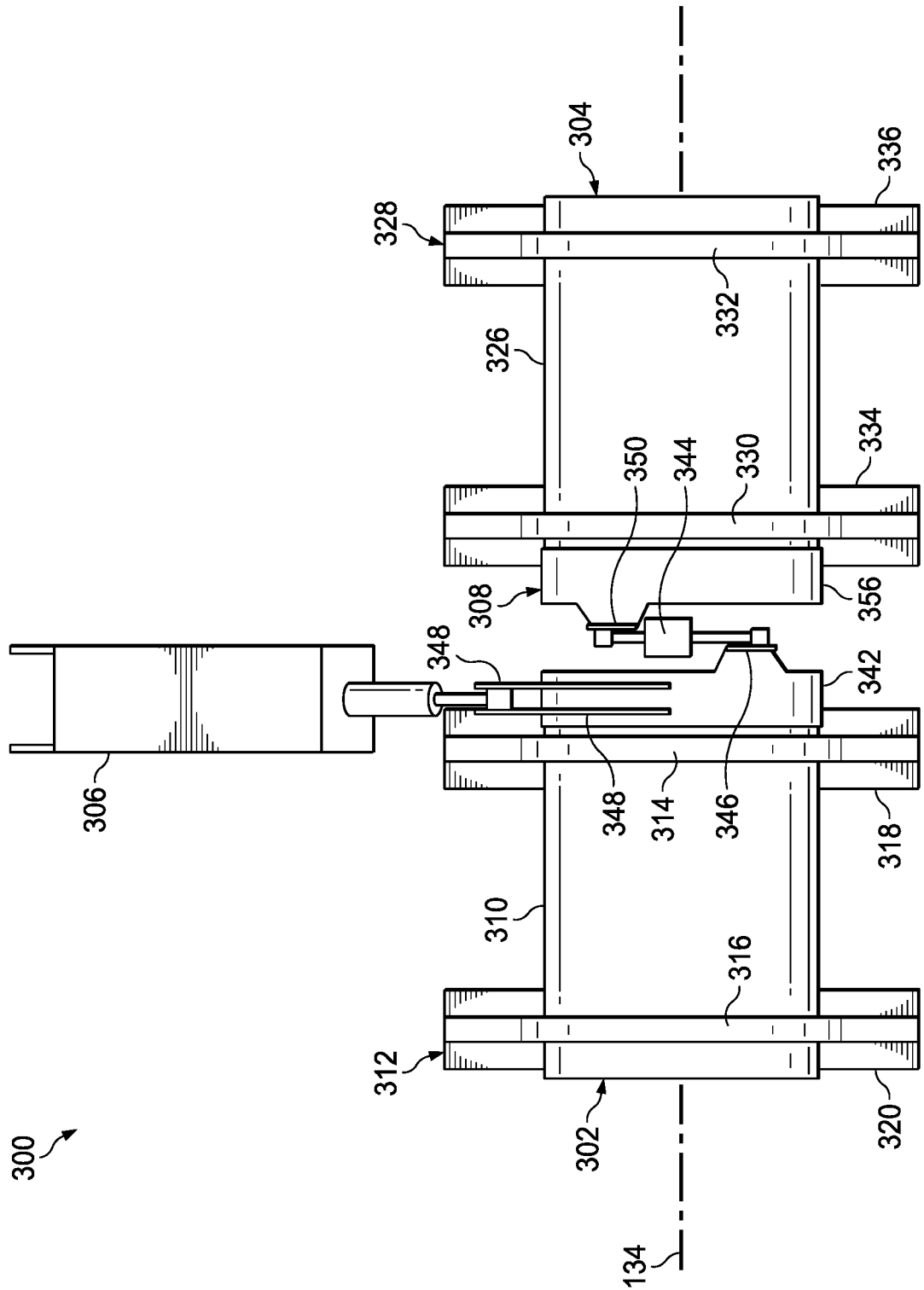
FIG. 8B is a top view of the wing rotation system of FIG. 8A.

Referring to FIGS. 8A and 8B, an example wing rotation system (i.e., differential wing rotation system 300) applicable for use with reference to the example aircraft 100 is shown. The differential wing rotation system 300 (i.e., lift offload system) may include a first wing rotation assembly 302, a second wing rotation assembly 304, a linear uniform actuator 306 (e.g., a pylon conversion actuator for uniform rotation), and a linear differential actuator assembly 308 (i.e., a linear trim actuator assembly, an angle adjustment actuator assembly).

As illustrated, the first wing rotation assembly 302 includes a first drive shaft 310 coupled to the first wing 116 for rotation about (around) the rotating axis 134. The first drive shaft 310 may include a flange for axial bolting to an attachment support (not shown). Alternatively, or additionally, the first drive shaft 310 may fit inside the attachment support, or the attachment support may fit inside the first drive shaft 310, to provide for radial bolting (coupling and control). Also, the first drive shaft 310 may be rotatably coupled to a first pillow block assembly 312 that may include a first pedestal 314 and a second pedestal 316 axially spaced from the first pedestal 314. In certain examples, the first pedestal 314 and the second pedestal 316 may be coupled to the airframe via plates 318 and 320, respectively. Also, the first drive shaft 310 may be rotatably coupled to the first pedestal 314 and the second pedestal 316 via roller bearings 322 and 324, respectively. Furthermore, while the first pillow block assembly 312 is shown with two pedestals, it should be understood that it may include one or more in other implementations.

As illustrated, the second wing rotation assembly 304 includes a second drive shaft 326 coupled to the second wing 318 for rotation around the rotating axis 334. The second drive shaft 326 may include a flange for axial bolting to an attachment support (not shown). Alternatively, or additionally, the second drive shaft 326 may fit inside the attachment support, or the attachment support may fit inside the first drive shaft 326, to provide for radial bolting (coupling and control). Also, the second drive shaft 326 may be rotatably coupled to a second pillow block assembly 328 that may include a first pedestal 330 and a second pedestal 332 axially spaced from the first pedestal 330. In certain examples, the first pedestal 330 and the second pedestal 332 may be coupled to the airframe via plates 334 and 336, respectively. Also, the second drive shaft 310 may be rotatably coupled to the first pedestal 330 and the second pedestal 332 via roller bearings 338 and 340, respectively. Furthermore, while the second pillow block assembly 328 is shown with two pedestals, it should be understood that it may include one or more in other implementations.

As further shown in FIGS. 8A-8B, the linear trim actuator assembly 308 includes a ring 342 coupled to the first drive shaft 310, the band 356 coupled to the second drive shaft 326, and a linear differential actuator 344 (i.e., linear trim actuator, angle adjustment actuator) coupled between the ring 342 and the band 356. The ring 342 may include a pair of tabs 348 configured to rotatably couple the ring 342 to the linear uniform actuator 306. Accordingly, the linear uniform actuator 306 is coupled to the first drive shaft 310 through the ring 342 (and between the first drive shaft 310 and the airframe (not shown)). Nevertheless, in other implementations, the linear uniform actuator 306 may be directly coupled to the first drive shaft 310. Moreover, the ring 342 further includes a projection 346 configured to rotatably couple to the linear differential actuator 344. Further, the band 356 may also include a projection 350 configured to rotatably couple to the linear trim actuator 344.

In an example operation, actuation of the linear uniform actuator 306 would cause the ring 342, the first drive shaft 310, and the first wing 116 to rotate together around the rotating axis 134. Suitably, as the ring 342 can be coupled to the band 356 via the linear differential actuator 344, the second drive shaft 326 and the second wing 120 would also rotate around the rotating axis 134 in response to actuation of the linear uniform actuator 306. Hence, differential rotation of the first and second wings 116, 118 is provided by the linear differential actuator 344. That is, actuation of the linear differential actuator 344 would cause the band 356, the second drive shaft 326, and the second wing 118 to rotate relative to the ring 342, the first drive shaft 310, and the first wing 116. For instance, in forward-flight mode of the example aircraft 100, both the linear uniform actuator 306 and the linear differential actuator 344 are actuated for the second positioning, where first wing 116 and second wing 118 may be substantially horizontal (as shown in FIG. 2) to provide additional lift for the aircraft 100. In contrast, when it is desirable to transition to hover mode, both the linear uniform actuator 306 and linear differential actuator 344 may be actuated for the first positioning, where the first wing 116 and the second wing 118 may be substantially vertical (as shown in FIG. 1). Hence, in this manner, the wings 116, 118 of the example rotorcraft 100 may transition from forward-flight mode to hover-mode, and vice-versa. In other examples, when the linear uniform actuator 306 and the linear differential actuator 344 are actuated for different positionings, differential tilting can be performed according to various implementations as described herein.

In certain implementations, the linear uniform actuator 306 and linear differential actuator 344 may be pneumatic, hydraulic, electric, or electromagnetic. In addition, the differential wing rotation system 300 may be configured such that failure of the linear uniform actuator 306 and/or linear differential actuator 344 would result in the first and second wings 116, 118 automatically defaulting to either the hover position or the forward-flight position, depending on the mission of the example aircraft 100 and the preference for a vertical landing versus a horizontal landing.

Figure 9A:
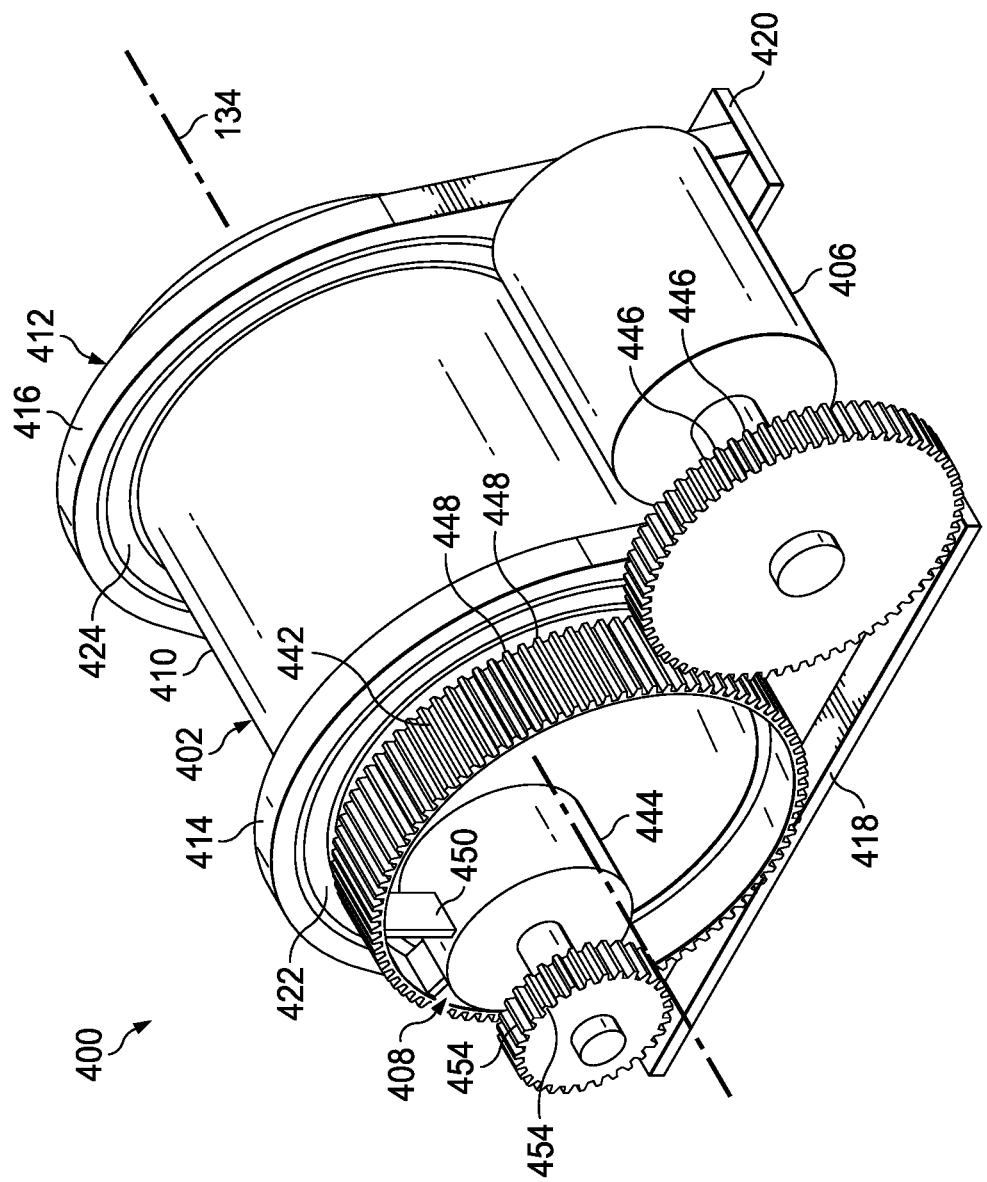
FIG. 9A is a perspective view of a first portion of another wing rotation system, in accordance with implementations of various techniques described herein.
Figure 9B:
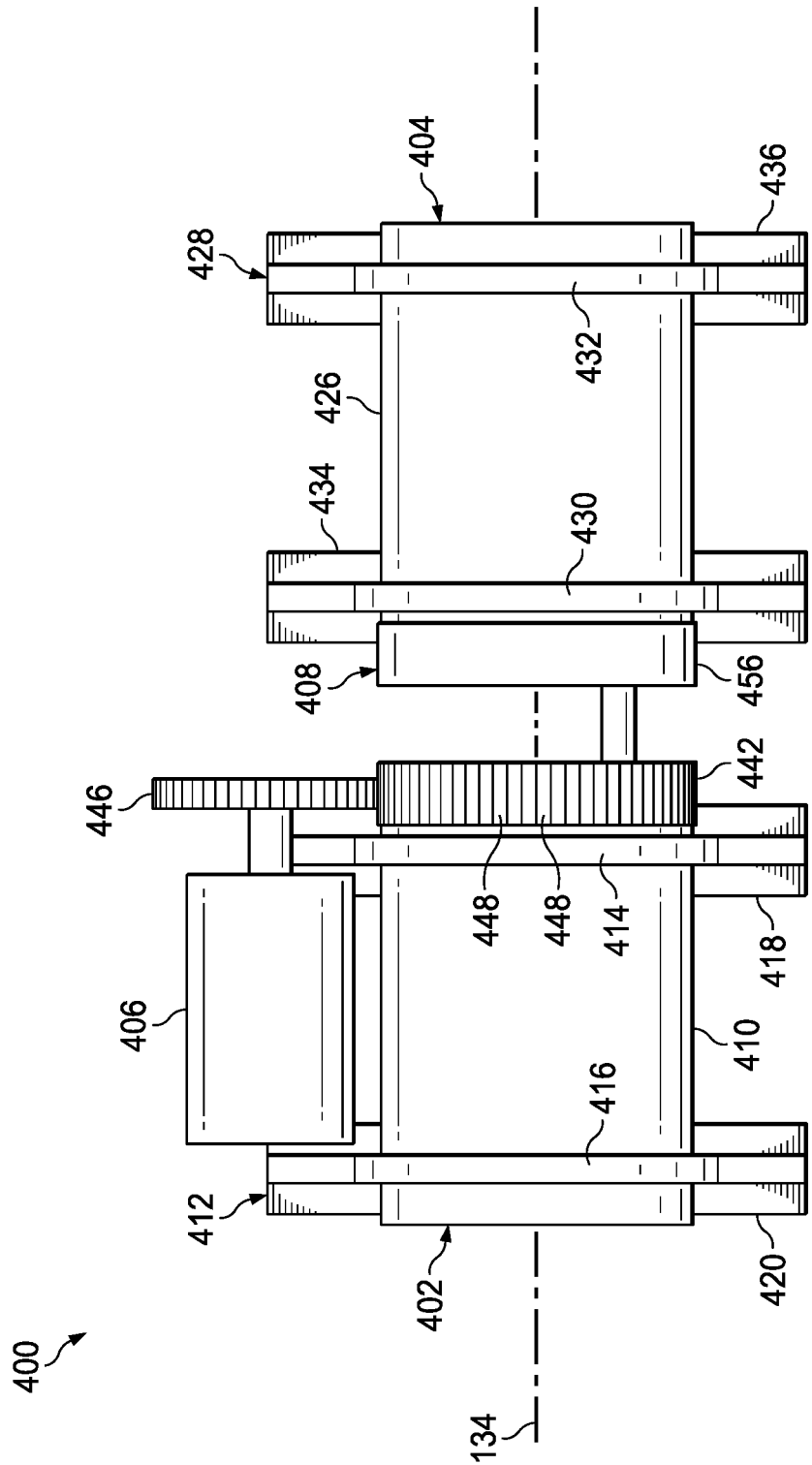
FIG. 9B is a top view of the wing rotation system of FIGS. 9A and 9C.
Figure 9C:
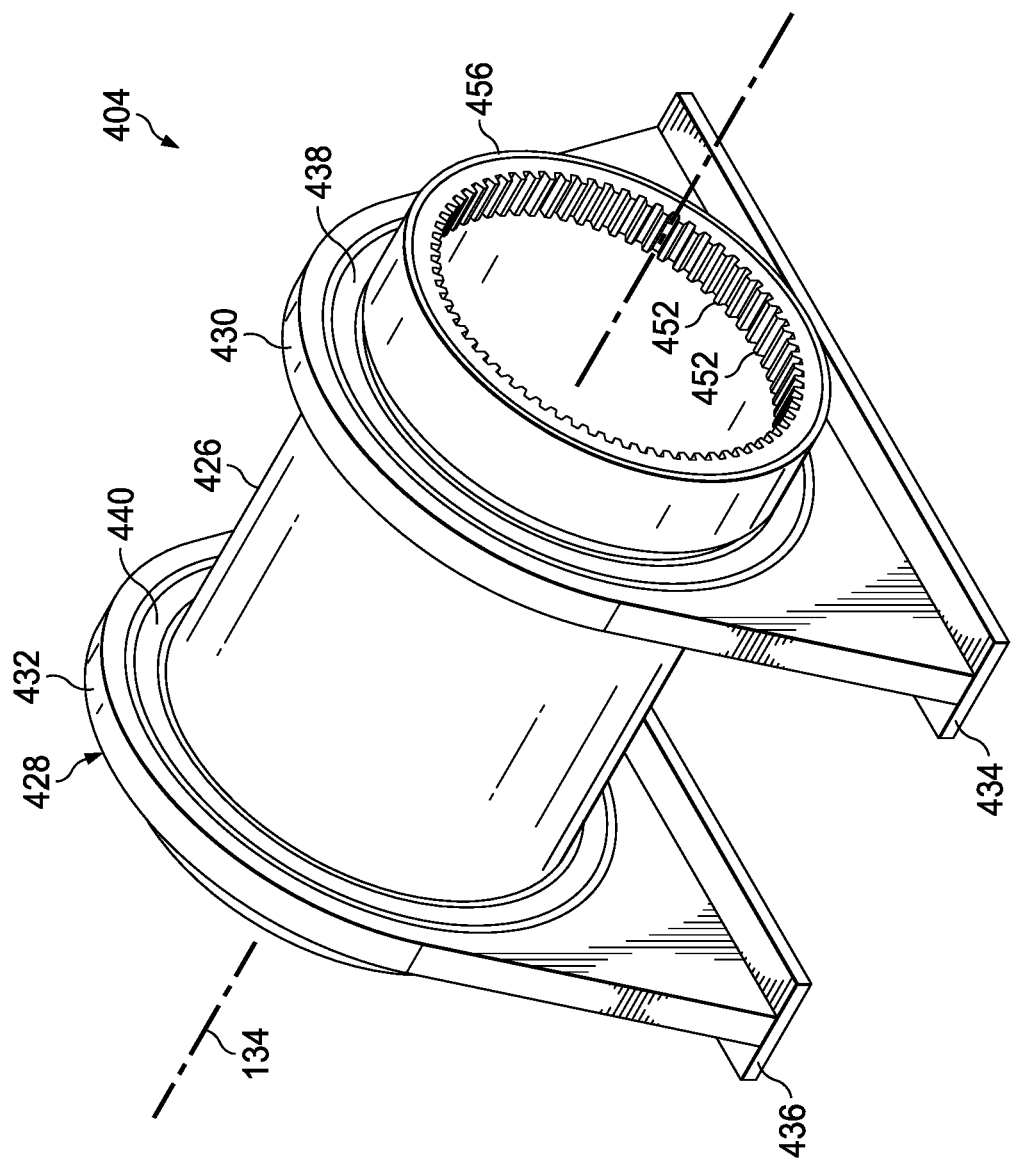
FIG. 9C is a perspective view of a second portion of the wing rotation system of FIG. 9A.

Referring to FIGS. 9A-9C, an example wing rotation system 400 (i.e., differential wing rotation system) applicable for use with reference to the example aircraft 100 is shown. The wing rotation system 400 (i.e., lift offload system) may include a first wing rotation assembly 402, a second wing rotation assembly 404, a rotary uniform actuator 406 (e.g., a pylon conversion actuator for uniform rotation), and a rotary trim actuator assembly 408.

As illustrated in FIGS. 9A and 9B, the first wing rotation assembly 402 includes a first drive shaft 410 coupled to the first wing 116 for rotation about (around) the rotating axis 134. The first drive shaft 410 may include a flange for axial bolting to an attachment support (not shown). Alternatively, or additionally, the first drive shaft 410 may fit inside the attachment support, or the attachment support may fit inside first drive shaft 410, to provide for radial bolting (coupling and control). Also, the first drive shaft 410 may be rotatably coupled to a first pillow block assembly 412 that may include a first pedestal 414 and a second pedestal 416 axially spaced from the first pedestal 414. In certain examples, the first pedestal 414 and the second pedestal 416 may be coupled to the airframe via plates 418 and 420, respectively. Also, the first drive shaft 410 may be rotatably coupled to the first pedestal 414 and the second pedestal 416 via roller bearings 422 and 424, respectively. Furthermore, while the first pillow block assembly 412 is shown with two pedestals, it should be understood that it may include one or more in other implementations.

As illustrated in FIGS. 9B and 9C, the second wing rotation assembly 204 includes a second drive shaft 426 coupled to the second wing 118 for rotation around the rotating axis 134. The second drive shaft 426 may include a flange for axial bolting to an attachment support (not shown). Alternatively, or additionally, the second drive shaft 426 may fit inside the attachment support, or the attachment post may fit inside the first drive shaft 426, to provide for radial bolting (coupling and control). Also, the second drive shaft 426 may be rotatably coupled to a second pillow block assembly 428 that may include a first pedestal 430 and a second pedestal 432 axially spaced from the first pedestal 430. In certain examples, the first pedestal 430 and the second pedestal 432 may be coupled to the airframe via plates 434 and 436, respectively. Also, the second drive shaft 410 may be rotatably coupled to the first pedestal 430 and the second pedestal 432 via roller bearings 438 and 440, respectively. Furthermore, while the second pillow block assembly 428 is shown with two pedestals, it should be understood that it may include one or more in other implementations.

As further shown in FIGS. 9A-9C, the rotary differential actuator assembly 408 (i.e., rotary trim actuator assembly) includes a first ring gear 442 coupled to the first drive shaft 410, a second ring gear 456 coupled to the second drive shaft 426, and a rotary differential actuator 344 (i.e., rotary trim actuator) coupled between the first gear ring 442 and the second gear ring 456. The first gear ring 442 may include external teeth 448 that is configured to mesh with external teeth 446 of the rotary uniform actuator 406. Accordingly, the rotary uniform actuator 406 is coupled to the first drive shaft 410 through the first ring gear 442 (and between the first drive shaft 410 and the airframe (not shown)). Moreover, the first ring gear 442 further includes a bracket 450 configured to rotatably couple to the rotary differential actuator 444. Further, the second ring gear 456 may also include internal teeth 452 configured to mesh with external teeth 454 of the rotary differential actuator 444.

In an example operation, actuation of the rotary uniform actuator 406 would cause the first ring gear 442, the first drive shaft 410, and the first wing 116 to rotate together around the rotating axis 134. Suitably, as the first ring gear 442 can be coupled to the second ring gear 456 via the rotary differential actuator 444, the second drive shaft 326 and the second wing 120 would also rotate around the rotating axis 134 in response to actuation of the rotary uniform actuator 406. Hence, differential rotation of the first and second wings 116, 118 is provided by the rotary differential actuator 444. That is, actuation of the rotary differential actuator 444 would cause the second ring gear 456, the second drive shaft 426, and the second wing 118 to rotate relative to the first ring gear 442, the first drive shaft 410, and the first wing 116. Accordingly, in forward-flight mode of the example aircraft 100, both the rotary uniform actuator 406 and the rotary differential actuator 444 may be actuated for the second positioning, where the first wing 116 and the second wing 118 may be substantially horizontal (as shown in FIG. 2) to provide additional lift for the aircraft 100. In contrast, when it is desirable to transition to hover mode, both the rotary uniform actuator 406 and rotary differential actuator 444 may be actuated for the first positioning, where the first wing 116 and the second wing 118 may be substantially vertical (as shown in FIG. 1). Hence, in this manner, the wings 116, 118 of the example rotorcraft 100 may transition from forward-flight mode to hover-mode, and vice-versa. In other examples, when the rotary uniform actuator 406 and the rotary differential actuator 444 are actuated for different positionings, differential tilting can be performed according to various implementations as described herein.

In certain implementations, the rotary uniform actuator 406 and rotary differential actuator 444 may be pneumatic, hydraulic, electric, or electromagnetic. In addition, the differential wing rotation system 400 may be configured such that failure of the rotary uniform actuator 406 and/or rotary differential actuator 444 would result in the first and second wings 116, 118 automatically defaulting to either the hover position or the forward-flight position, depending on the mission of the example aircraft 100 and the preference for a vertical landing versus a horizontal landing.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) disclosed herein include a variety of components, features, and functionalities. It should be understood that the various examples of the device(s) disclosed herein may include any of the components, features, and functionalities of any of the other examples of the device(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A rotorcraft comprising:
   a fuselage;
   an airframe;
   a main rotor coupled to a roof of the rotorcraft;
   first and second wings; and
   a wing rotation system coupled to the first and the second wings, the wing rotation system comprising:
     a first drive shaft coupled to the first wing for rotation around a central wing axis;
     a second drive shaft coupled to the second wing for rotation around the central wing axis;
     a planetary gear system coupled to the first drive shaft and the second drive shaft, the planetary gear system having a plurality of gears comprising a sun gear, a ring gear, and a planetary gear, wherein one of the plurality of gears is coupled to the first drive shaft, and another one of the plurality of gears is coupled to the second drive shaft; and a uniform actuator coupled between the first drive shaft and the airframe, wherein the uniform actuator is coupled to the first drive shaft through one of the plurality of gears of the planetary gear system;
wherein the uniform actuator is configured to actuate rotation of the first drive shaft to a first position, and the uniform actuator is configured to further actuate rotation of the second drive shaft via the planetary gear system to a second position different from the first position.

2. The rotorcraft of claim 1, wherein the wing rotation system is configured to rotate the first and the second wings to a substantially vertical positioning in hover mode.

3. The rotorcraft of claim 1, wherein the wing rotation system is configured to rotate the first and the second wings to a substantially horizontal positioning in forward-flight mode.

4. The rotorcraft of claim 1, wherein the first and the second wings do not include propulsion devices.

5. The rotorcraft of claim 1, wherein the planetary gear system is configured to provide speed and torque conversions for the uniform actuator to actuate rotation of the first and the second wings.

6. The rotorcraft of claim 1, wherein the sun gear is coupled to the first drive shaft, and the planetary gear is coupled to the second drive shaft.

7. The rotorcraft of claim 6, wherein the ring gear is fixed.

8. The rotorcraft of claim 1, wherein the ring gear is coupled to the first drive shaft, and the planetary gear is coupled to the second drive shaft.

9. The rotorcraft of claim 1, wherein the gear coupled to the first drive shaft has a different rate of rotation from the gear coupled to the second drive shaft.

10. The rotorcraft of claim 1, wherein the uniform actuator is a linear actuator.

11. The rotorcraft of claim 1, wherein the planetary gear system further comprises a planetary gear carrier, the planetary gear carrier having a post coupled to the second drive shaft.

12. A wing rotation system of a rotorcraft comprising:
a first drive shaft coupled to a first wing for rotation of the first wing around a central wing axis;
a second drive shaft coupled to a second wing for rotation of the second wing around the central wing axis;
a planetary gear system coupled to the first drive shaft and the second drive shaft, the planetary gear system having a plurality of gears comprising a sun gear, a ring gear, and a planetary gear, wherein one of the plurality of gears is coupled to the first drive shaft, and another one of the plurality of gears is coupled to the second drive shaft; and
a uniform actuator coupled between the first drive shaft and an airframe, wherein the uniform actuator is coupled to the first drive shaft through one of the plurality of gears of the planetary gear system, the uniform actuator is configured to actuate rotation of the first drive shaft to a first position, and the uniform actuator is configured to further actuate rotation of the second drive shaft via the planetary gear system to a second position different from the first position.

13. The wing rotation system of claim 12, wherein the uniform actuator is configured to transition to a first position when the first and second wings are in hover-mode, and wherein the uniform actuator is configured to transition to a second position when the first and second wings are in forward-flight mode.

14. The wing rotation system of claim 12, wherein the sun gear is coupled to the first drive shaft, and the planetary gear is coupled to the second drive shaft.

15. The wing rotation system of claim 12, wherein the gear coupled to the first drive shaft has a different rate of rotation from the gear coupled to the second drive shaft.

16. A wing rotation system of a rotorcraft comprising:
a first drive shaft coupled to a first wing for rotation around a central wing axis;
a second drive shaft coupled to a second wing for rotation around the central wing axis;
a uniform actuator coupled between the first drive shaft and an airframe; and
a planetary gear system;
wherein the wing rotation system is configured to actuate rotation of the first and the second wings from a first direction to a second direction;
wherein the planetary gear system comprises:
a ring gear coupled for rotation with one of the first drive shaft or the second drive shaft;
a non-rotatable sun gear; and
a plurality of planetary gears coupled for rotation with one of the first drive shaft or the second drive shaft that is not coupled for rotation with the ring gear.

17. A wing rotation system of a rotorcraft comprising:
a first drive shaft coupled to a first wing for rotation around a central wing axis;
a second drive shaft coupled to a second wing for rotation around the central wing axis;
a planetary gear system; and
a uniform actuator coupled between the first drive shaft and an airframe;
wherein the wing rotation system is configured to actuate rotation of the first and the second wings from a first direction to a second direction; and
wherein the planetary gear system comprises:
a non-rotatable ring gear;
a plurality of planetary gears coupled for rotation with one of the first drive shaft or the second drive shaft; and
a sun gear coupled for rotation with one of the first drive shaft or the second drive shaft that is not coupled for rotation with the plurality of planetary gears.

18. A rotorcraft comprising:
a fuselage;
an airframe;
a main rotor coupled to a roof of the rotorcraft;
first and second wings; and
a wing rotation system coupled to the first and the second wings, the wing rotation system comprising:
a first drive shaft coupled to the first wing for rotation around a central wing axis;
a second drive shaft coupled to the second wing for rotation around the central wing axis;
a planetary gear system coupled to the first drive shaft and the second drive shaft, the planetary gear system having a plurality of gears comprising a sun gear, a ring gear, and a planetary gear, wherein one of the plurality of gears is coupled to the first drive shaft, and another one of the plurality of gears is coupled to the second drive shaft; and
a uniform actuator coupled between the first drive shaft and the airframe, wherein the uniform actuator is coupled to the first drive shaft through one of the plurality of gears of the planetary gear system;

wherein the wing rotation system is configured to, at the same time, rotate the first and second wings in different directions at different non-zero speeds relative to one another.

19. The rotorcraft of claim 18, wherein the first and the second wings comprise respective first and second flaps, and wherein the first and the second flaps are configured to tilt in different directions relative to one another and the first and the second wings.

20. The rotorcraft of claim 19, wherein the first and the second wings do not include propulsion devices.

\* \* \* \* \*